United States Patent [19]

Barkley

[11] Patent Number: 5,286,188
[45] Date of Patent: Feb. 15, 1994

[54] UNI-DIRECTIONAL ANTI-BACKSIFTING FLUIDIZATION NOZZLE AND A FLUIDIZED BED SYSTEM UTILIZING SAME

[75] Inventor: James D. Barkley, Boundbrook, N.J.

[73] Assignee: Foster Wheeler Energy Corporation, Clinton, N.J.

[21] Appl. No.: 943,653

[22] Filed: Sep. 11, 1992

[51] Int. Cl.⁵ .......................................... F23D 21/00
[52] U.S. Cl. ..................................... 431/170; 431/7;
       431/328; 110/243; 110/245; 137/533.31;
       432/58
[58] Field of Search ............... 431/170, 89, 38, 328,
       431/7; 422/139; 432/58, 14; 110/243, 245;
       137/533.31

[56] References Cited

U.S. PATENT DOCUMENTS

| | | |
|---|---|---|
| 4,335,661 | 6/1982 | Stewart et al. |
| 4,349,969 | 9/1982 | Stewart et al. |
| 4,397,102 | 8/1983 | Gamble et al. |
| 4,436,507 | 3/1984 | Stewart et al. |
| 4,446,629 | 5/1984 | Stewart et al. |
| 4,460,330 | 7/1984 | Asai et al. |
| 4,521,976 | 6/1985 | Stewart et al. |
| 4,574,406 | 3/1986 | Sedlacek ........................ 431/170 X |
| 4,813,817 | 3/1989 | Junier ........................ 137/533.31 X |
| 4,865,540 | 9/1989 | Fitzgerald ........................ 431/89 |
| 5,105,559 | 4/1992 | Toth. |

FOREIGN PATENT DOCUMENTS

53-118870 10/1978 Japan.
8101701 4/1981 Netherlands.

Primary Examiner—Larry Jones
Attorney, Agent, or Firm—Marvin A. Naigur

[57] ABSTRACT

A fluidized bed system in which a plate is disposed in an enclosure and is adapted to support particulate material. A plurality of nozzles are supported by the plate for receiving air and directing the air through the plate and into the particulate material to fluidize same. Each of the nozzles includes a vertical tubular portion extending upwardly from the plate for receiving air from the air plenum, an angled tubular portion extending downwardly and outwardly from the vertical tubular portion for discharging the air, and a valve member movably housed in the vertical tubular portion, which permits air flow during operation but, upon shutdown, seals the nozzle and prevents backflow or backsifting of the particulate material.

36 Claims, 1 Drawing Sheet

UNI-DIRECTIONAL ANTI-BACKSIFTING FLUIDIZATION NOZZLE AND A FLUIDIZED BED SYSTEM UTILIZING SAME

BACKGROUND OF THE INVENTION

This invention relates to a fluidization nozzle and a fluidized bed system utilizing same and, more particularly, to such a nozzle and system in which a bed of particulate material is fluidized by the introduction of air into the bed through the nozzle without the particulate material in the bed being allowed to backsift through the nozzle.

Fluidized bed reactors, such as gasifiers, steam generators, combustors, and the like, are well known. In these arrangements, pressurized air or other fluidizing media is passed, via a plurality of nozzles, through a bed of particulate material, including a fossil fuel such as coal and an adsorbent for the sulfur generated as a result of combustion of the coal, to fluidize the bed and to promote the combustion of the fuel at a relatively low temperature. The heat produced by the fluidized bed is utilized in various applications such as the generation of steam, which results in an attractive combination of high heat release, high sulfur adsorption, low nitrogen oxide emissions and fuel flexibility.

The most typical fluidized bed reactor is commonly referred to as a "bubbling" fluidized bed in which the bed of particulate material has a relatively high density and a well-defined, or discrete, upper surface.

Other types of fluidized bed reactors utilize a "circulating" fluidized bed. According to these processes, the fluidized bed density is well below that of a typical bubbling fluidized bed, the air velocity is greater than that of a bubbling bed, and the air entrains a substantial amount of particulate solids and is substantially saturated therewith.

In the event the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, which separates the water from the converted steam, which is routed either to a steam turbine or the like.

In both the bubbling and circulating fluidized bed arrangements, an air plenum is disposed below an air distributor plate, or grid, for supplying pressurized air to the bed. In some arrangements a plurality of air nozzles are supported by the plate and extend above the plate into the bed. The nozzles receive air from the plenum and discharge the air into the bed in a predetermined flow pattern.

However, the solids from the bed can backflow or backsift through the nozzles into the air plenum, especially in connection with circulating fluidized beds when the unit is suddenly shut down while operating at full loads. As a result, the solids will accumulate in the air plenum and block air flow through the nozzles.

SUMMARY OF THE INVENTION

It is therefore an object of the present invention to provide a fluidization nozzle which introduces air or other fluidizing medium from an air plenum into an enclosure containing a bed of particulate material.

It is a further object of the present invention to provide a nozzle of the above type which is designed to eliminate or reduce the backflow of bed materials from the fluidized bed to the air plenum.

It is a further object of the present invention to provide a nozzle of the above type which, upon system shutdown and particulate material defluidization, establishes a seal so that said defluidizing particulate material is prevented from flowing or sifting back through the nozzle into the air plenum.

It is a further object of the present invention to provide a fluidized bed system utilizing a plurality of nozzles of the above type.

Toward the fulfillment of these and other objects, the fluidization nozzle of the present invention is mounted on a distributor plate which supports a bed of particulate material and receives air flow from an air plenum located below the plate. The nozzle includes a vertical tubular portion for receiving the air, an angled tubular portion for discharging the air, and a valve member housed in the vertical tubular portion, which does not obstruct the air flow during operation but, upon shutdown, seals the vertical tubular portion which prevents backflow or backsifting of the particulate material.

DESCRIPTION OF THE DRAWINGS

The above brief description, as well as further objects, features, and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
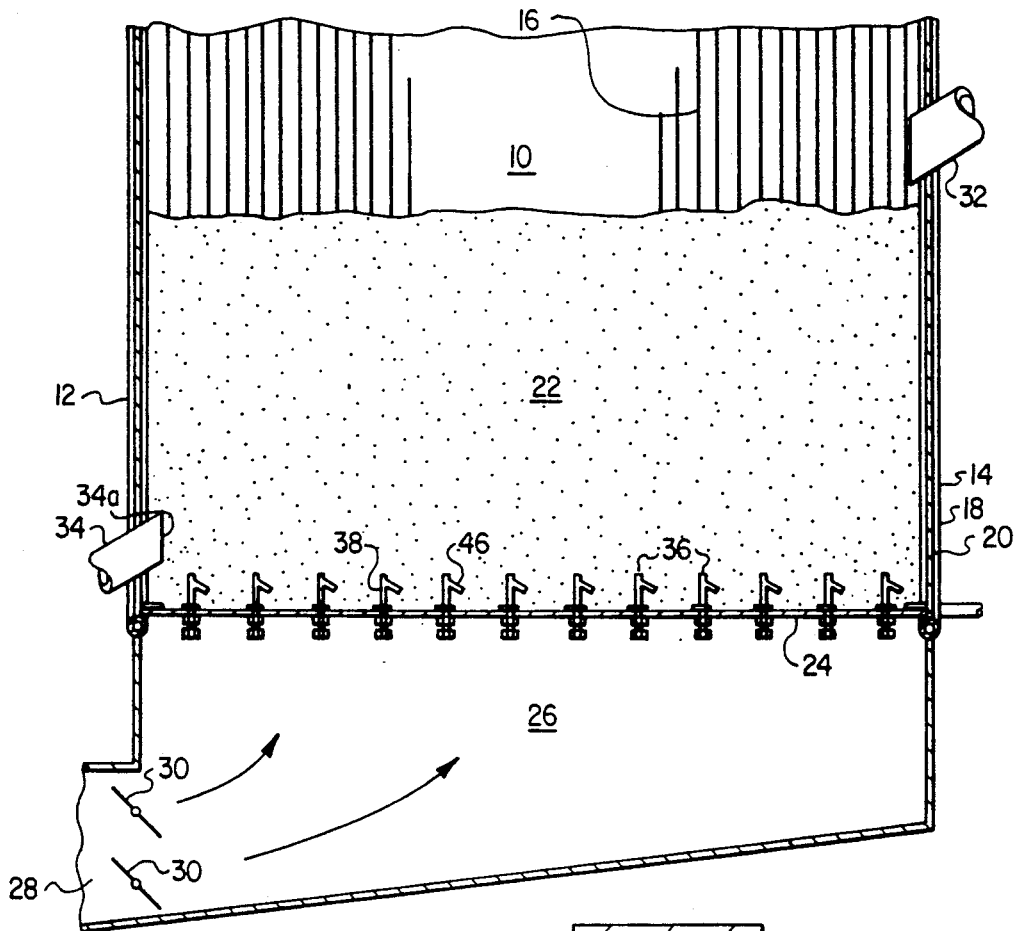
FIG. 1 is a vertical sectional view of a fluidized bed reactor depicting a plurality of fluidizing nozzles of the present invention.

The fluidization nozzle of the present invention will be described in connection with a reactor in the form of a boiler, a combustor, a furnace, or any similar type device utilizing a bubbling fluidized bed. The reactor includes an enclosure 10 consisting of a plurality of walls, three of which are shown by the reference numerals 12, 14, and 16. Each wall is formed by a plurality of vertically-disposed tubes 18 interconnected by vertically elongated bars or fins 20 to form a substantially rectangular, contiguous, and air-tight structure. Flow circuitry (not shown) is provided to pass water through the tubes to convert the water to steam. Since this type of structure is conventional, it is not shown in the drawings nor will it be described in any further detail. The upper portion of the enclosure 10 is not shown for the convenience of presentation, it being understood that it consists of a convection section, a roof, and an outlet for allowing the combustion gases to discharge, all formed in a conventional manner.

A bed of particulate material, shown in general by the reference numeral 22, is disposed within the enclosure 10 and rests on a perforated plate or grid 24 extending horizontally across the lower portion of the enclosure 10 and supported by the enclosure walls, including the walls 12, 14, and 16, in any conventional manner. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and a inlet 28 is in fluid communication with the air plenum 26 for distributing pressurized air from an external source (not shown) to the air plenum 26 under the control of a pair of dampers 30.

An overbed feeder 32 extends through the wall 14, receives particulate coal from inlet ducts or the like (not shown), and is adapted to feed the coal particles onto the upper surface of the bed 22. The feeder 32 can operate by gravity discharge or can be in the form of a spreader-type feeder. It is understood that a feeder can also be provided for discharging the absorbent onto the bed 22, and would be constructed and arranged in a manner similar to the feeder 32.

A drain pipe 34 extends through the wall 12 and has an inlet end portion 34a that registers with the interior of the enclosure 10 in communication with the lower portion of the bed 22. The drain pipe 34 is thus adapted to receive the spent bed material and functions to discharge the spent bed material from the enclosure 10 by gravity to a screw conveyor, conveyor belt, or the like (not shown).

It is understood that a bed light-off burner (not shown) is provided for initially lighting off the bed during startup in a conventional manner.

Figure 2:
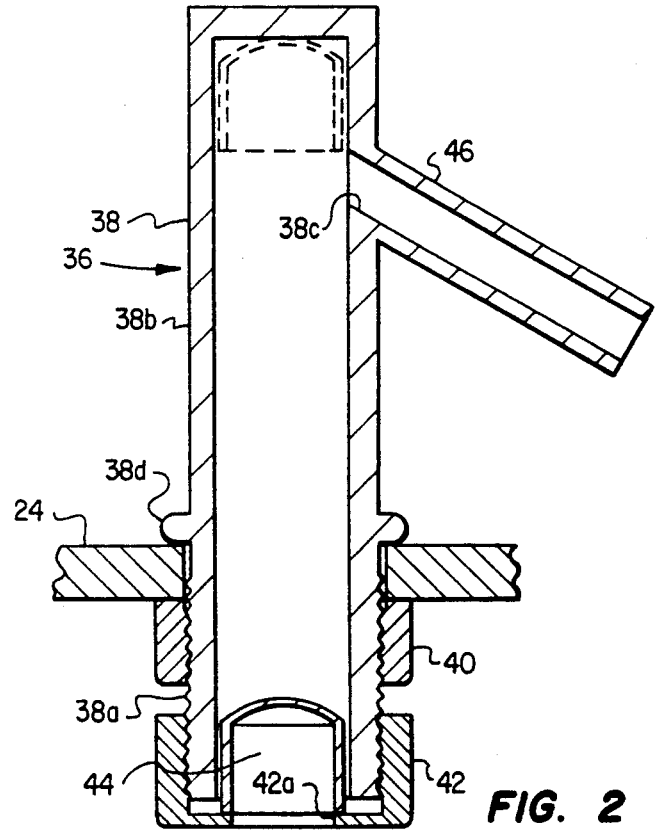
FIG. 2 is an enlarged, cross-sectional view depicting a fluidizing nozzle of FIG. 1.

A plurality of fluidization nozzles, referred to in general by the reference numeral 36 and shown in detail in FIG. 2, extends through, and is supported by, the plate 24. Each nozzle 36 includes a vertical tubular portion 38 extending through a corresponding opening in the plate 24 and secured to the plate 24 by a threaded nut 40.

The vertical tubular portion 38 of the nozzle 36 includes a lower, externally-threaded portion 38a projecting below the plate 24 for attaching the nozzle 36 to the plate 24 and for receiving air from the air plenum 26, an upper portion 38b extending above the plate 24 and into the bed 22, an outlet opening 38c extending through the tubular portion 38, and a protruding flange, or spacer, 38d which separates the upper portion 38b and the lower portion 38a and provides resistance for the threaded nut 40 to secure the nozzle 36 to the plate 24. An internally-threaded cap 42 is attached to the lower end of the lower portion 38a, and is configured to define a hole 42a with a diameter slightly less than the inside diameter of the vertical tubular portion 38.

The vertical tubular portion 38 houses a valve member 44, in the form of a weighted stopper, which has a diameter slightly less than the inside diameter of the vertical tubular portion 38 and slightly greater than the diameter of the hole 42a. These differences in diameter allow the valve member 44 to move within the vertical tubular portion 38, yet be retained in the bottom of the tubular portion 38 by the cap 42. When the valve member 44 is located at the bottom of the vertical tubular portion 38, a seal is formed between the lower portion 38a, the cap 42, and the valve member 44, which prevents the discharge of particulate material from the lower end of the nozzle 36.

An angled tubular portion 46 is connected to the vertical tubular portion 3 and registers with the outlet opening 38c. The angled tubular portion 46 extends outwardly and downwardly from the upper portion of the vertical tubular portion 38 and the outlet opening 38c is located a distance from the upper end of the tubular portion 38 to allow the valve member 44 to take the position shown by the dashed lines above the outlet opening 38c under certain operating conditions so as not to obstruct the opening 38c, as will be described.

In operation, the dampers 30 associated with the air plenum 26 are opened and pressurized air passes up through the air plenum 26 and into the lower portion 38a of the vertical tubular portion 38 of each nozzle 36. As the initial air flow enters the vertical tubular portion 38, the valve member 44 blocks the flow of air and is pushed by the force of the air upwardly through the vertical tubular portion 38 to its upper position where it comes to rest above the opening 38c, as shown by the dashed lines in FIG. 1. Upon reaching the top of the vertical tubular portion 38, the valve member 44 no longer impedes the air flow through the nozzle 36 and the air thus flows upwardly through the vertical tubular portion 38 and downwardly and outwardly through the angled tubular portion 46 before being discharged into the bed 22. The air passes through the bed 22, fluidizes it, and then passes, by convection, through the enclosure 10 in a generally upwardly direction. The portion of the particulate material in the bed 22 extending immediately above the angled tubular portion 46 is fluidized and the portion extending between the angled tubular portion 46 and the upper surface of the plate 24 remains dormant, or stagnant.

As shown in FIG. 1, the nozzles 36 are oriented so that their angled tubular portions 46 are generally directed towards the wall 14. Although not clear from the drawing, it is understood that the latter angled tubular portions 46 can also be directed towards the wall 12. The orientation of the nozzles 36 imparts a momentum to the bed material which induces a circulation of the material to insure distribution, mixing, and draining of the particulate material.

A light-off burner in the reactor is then fired to heat the material in the bed 22 until the temperature of the material reaches a predetermined level, and additional particulate fuel is discharged from the feeder 32 while adsorbent material is discharged onto the upper surface of the bed 22 as needed.

After the bed 22 has been fluidized and has reached a predetermined elevated temperature in accordance with the foregoing, the light-off burner is turned off while the feeder 32 continues to distribute particulate fuel to the upper surface of the bed in accordance with predetermined feed rates. Air continues to flow throughout the operation of the reactor.

Upon shutdown, the dampers 30 are closed, which stops the flow of air. The valve member 44 falls to the bottom of the vertical tubular portion 38 due to the force of gravity and forms a seal with the threaded cap 42 and the lower portion 38a. As a result of the foregoing, backflow of the material from the bed 22, through the nozzles 36 and into the air plenum 26 is prevented. Also, the dormant layer of particulate material extending between the upper surface of the plate 24 and the angled tubular portions 46 of the nozzles 36 acts to insulate the plate 24.

It is understood that the fluidization nozzles 36 can take a different configuration from that discussed above, and the number and specific locations of the nozzles and their specific orientation can be varied as long as the above objectives and results are achieved.

Other variations in the basic inventive concept described above can be made without departing from the scope of the invention. For example, the nozzle of the present invention can be used in other fluidized bed systems such as stripper coolers, J-valves, seal pots, etc.

Other modifications, changes, and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidized bed system comprising an enclosure, means for introducing particulate material into said enclosure, a plate disposed in said enclosure and adapted to support said particulate material, a source of air, and at least one nozzle supported by said plate for receiving said air and directing said air through said plate and into said particulate material to fluidize same, said nozzle comprising a tubular portion for receiving air from said air source, and means for allowing the air to flow unobstructed through said tubular portion during operation of said system but preventing backflow of particulate material through said tubular portion when said system is not in operation.

2. The fluidized bed system of claim 1 wherein said tubular portion extends upwardly from said plate.

3. The fluidized bed system of claim 2 wherein said nozzle further comprises an additional tubular portion connected to and in fluid communication with the upper portion of the first-mentioned tubular portion for discharging air into said enclosure.

4. The fluidized bed system of claim 3 wherein said first tubular portion extends generally vertically and said additional tubular portion extends downwardly from, and at an angle to, said first tubular portion.

5. The fluidized bed system of claim 3 wherein said additional tubular portion registers with an opening in said first-mentioned tubular portion, said opening being spaced from one end of said first tubular portion.

6. The fluidized bed system of claim 5 wherein said air flow means includes a valve member adapted for movement in said first tubular portion.

7. The fluidized bed system of claim 6 wherein said valve member moves between a first position in which it prevents said backflow and a second position in which it permits said unobstructed air flow.

8. The fluidized bed system of claim 7 wherein said first-mentioned tubular member has an inlet opening for receiving said air, said inlet opening being disposed at the other end thereof in a spaced relation to said first-mentioned opening and being blocked by said valve member when said valve member is in said first position.

9. The fluidized bed system of claim 7 wherein said valve member is lifted from said first position to said second position by the force of said air.

10. The fluidized bed system of claim 8 wherein said inlet opening is disposed at the lower end of said tubular member and wherein said valve member moves to said first position under the force of gravity.

11. The fluidized bed system of claim 8 wherein said valve member extends into the space between said opening and said one end of said first-mentioned tubular portion in said second position.

12. A nozzle for fluidizing a particulate material supported on a plate in an enclosure, said nozzle comprising a tubular portion for receiving air, and means for allowing the air to flow unobstructed through said tubular portion during operation to fluidize said particulate material, but preventing backflow of said particulate material through said tubular portion when not in operation.

13. The nozzle of claim 12 wherein said tubular portion extends upwardly from said plate.

14. The nozzle of claim 13 wherein said nozzle further comprises an additional tubular portion connected to and in fluid communication with the upper portion of the first-mentioned tubular portion for discharging air into said enclosure.

15. The nozzle of claim 14 wherein said first tubular portion extends generally vertically and said additional tubular portion extends downwardly from, and at an angle to, said first tubular portion.

16. The nozzle of claim 14 wherein said additional tubular portion registers with an opening in said first-mentioned tubular portion, said opening being spaced from one end of said first tubular portion.

17. The nozzle of claim 16 wherein said air flow means includes a valve member adapted for movement in said first tubular portion.

18. The nozzle of claim 17 wherein said valve member moves between a first position in which it prevents said backflow and a second position in which it permits said unobstructed air flow.

19. The nozzle of claim 18 wherein said first-mentioned tubular member has an inlet opening for receiving said air, said inlet opening being disposed at the other end thereof in a spaced relation to said first-mentioned opening and being blocked by said valve member when said valve member is in said first position.

20. The nozzle of claim 18 wherein said valve member is lifted from said first position to said second position by the force of said air.

21. The nozzle of claim 19 wherein said inlet opening is disposed at the lower end of said tubular member and wherein said valve member moves to said first position under the force of gravity.

22. The nozzle of claim 19 wherein said valve member extends into the space between said opening and said one end of said first-mentioned tubular portion in said second position so as not to obstruct said air flow.

23. A fluidized bed system comprising an enclosure, means for introducing particulate material into said enclosure, a plate disposed in said enclosure and adapted to support said particulate material, a source of air, and at least one nozzle supported by said plate for receiving said air and directing said air through said plate and into said particulate material to fluidize same, said nozzle comprising a first tubular portion extending from said plate for receiving air, a second tubular portion extending from said first tubular portion, discharge means extending between said tubular portions for receiving air flowing through said first tubular portion and discharging said air, and a valve member normally disposed in said first tubular portion for preventing backflow of said particulate material, said valve member moving from said first tubular portion to said second tubular portion in response to said air flow to permit an unobstructed flow of air from said first tubular portion to said discharge means.

24. The fluidized bed system of claim 23 wherein said first tubular portion extends upwardly from said plate and said second tubular portion extends upwardly from said first tubular portion.

25. The fluidized bed system of claim 23 wherein said discharge means comprises an opening extending through the wall of one of said tubular portions, and a third tubular portion registering with said opening and projecting outwardly from said first and second tubular portions.

26. The fluidized bed system of claim 25 wherein said first and second tubular portions extend generally vertically and said third tubular portion extends downwardly from, and at an angle to, said first and second tubular portions.

27. The fluidized bed system of claim 23 wherein said first tubular portion has an inlet opening at one end thereof for receiving said air, said valve member normally blocking said inlet opening.

28. The fluidized bed system of claim 27 wherein said valve member moves to said backflow preventing position under the force of gravity.

29. The fluidized bed system of claim 23 wherein said valve member is lifted from said first tubular portion to said second tubular portion by the force of said air.

30. A nozzle for fluidizing a particulate material supported on a plate in an enclosure, said nozzle comprising a first tubular portion extending from said plate for receiving air, a second tubular portion extending from said first tubular portion, discharge means extending between said tubular portions for receiving air flowing through said first tubular portion and discharging said air, and a valve member normally disposed in said first tubular portion for preventing backflow of said particulate material, said valve member moving from said first tubular portion to said second tubular portion in response to said air flow to permit an unobstructed flow of air from said first tubular portion to said discharge means.

31. The nozzle of claim 30 wherein said first tubular portion extends upwardly from said plate and said second tubular portion extends upwardly from said first tubular portion.

32. The nozzle of claim 30 wherein said discharge means comprises an opening extending through the wall of one of said tubular portions, and a third tubular portion registering with said opening and projecting outwardly from said first and second tubular portions.

33. The nozzle of claim 32 wherein said first and second tubular portions extend generally vertically and said third tubular portion extends downwardly from, and at an angle to, said first and second tubular portions.

34. The nozzle of claim 30 wherein said first tubular portion has an inlet opening at one end thereof for receiving said air, said valve member normally blocking said inlet opening.

35. The nozzle of claim 34 wherein said valve member moves to said backflow preventing position under the force of gravity.

36. The nozzle of claim 30 wherein said valve member is lifted from said first tubular portion to said second tubular portion by the force of said air.

* * * * *

UNITED STATES PATENT AND TRADEMARK OFFICE
CERTIFICATE OF CORRECTION

PATENT NO. : 5,286,188
DATED : February 15, 1994
INVENTOR(S) : James D. Barkley

It is certified that error appears in the above-indentified patent and that said Letters Patent is hereby corrected as shown below:

Column 3, line 62, "portion 3" should read --portion 38--.

Signed and Sealed this

Twenty-eighth Day of June, 1994

Attest:

BRUCE LEHMAN

Attesting Officer     Commissioner of Patents and Trademarks